United States Patent Office 3,151,149
Patented Sept. 29, 1964

3,151,149
PRODUCTION OF PURE D- AND L-CARNITINE-NITRILE-CHLORIDE
Erich Strack and Irmgard Lorenz, Leipzig, Germany, assignors to VEB Berlin-Chemie, Berlin-Adlershof, Germany
No Drawing. Filed Jan. 27, 1960, Ser. No. 4,865
6 Claims. (Cl. 260—465.5)

The present invention relates to the production of pure L- and D-carnitine nitrile-chloride.

Up to now, L-carnitine has been isolated from animal tissues, more particularly the striated muscles of warm-blooded animals, or from Liebig's extract. Small amounts of D-carnitine can be obtained by inoculating a D,L-carnitine containing nutrient solution with a strain of psuedomonas which only uses up L-carnitine. Both processes are cumbersome, time consuming, expensive, and yields are poor.

Another known process consists in separating the N-benzoyl derivative of the racemic D,L-$\gamma$-amino-$\beta$-hydroxybutyric acid with brucine and methylating the amino group of the optically active substances with methyl iodide. When fully synthetic methods were applied, active carnitines were only obtained in very poor yields and as non-uniform products.

It is the object of the present invention to overcome the above-mentioned disadvantages and provide a method for obtaining L- and D-carnitine in pure form, good yield and by inexpensive means.

The present invention achieves these objects by splitting of racemic carnitine derivatives, or of racemic products formed during preparatory stages in the synthesis of D,L-carnitine. In this manner it is possible to obtain D- and L-carnitine of high purity in good yields by relatively simple and inexpensive procedures.

We have found, unexpectedly, that D,L-carnitine can be easily separated into the optically active components by optically active acids, e.g. D (+) tartaric acid, or dibenzoyl-D(−) tartaric acid, or camphorsulfonic acid, or a combination of the mentioned acids, provided the carboxyl group is not free but is, for instance, esterified. It is advantageous to separate intermediate products obtained in the synthesis of D,L-carnitine which already have the carbon structure of the carnitine. In an analogous manner, isotope labelled carnitines can easily be prepared.

When we choose, e.g. the following synthesis, which is known per se, stages III and IV are well adapted for the splitting into optically active components according to the invention; it should be noted that III, in comparison to IV, has the higher stability:

Epichlorohydrine (I) + liquid hydrocyanic acid → D,L-chloro-$\beta$-hydroxybutyric nitrile (II);
II + trimethylamine → D,L-carnitine nitrile (III);
III + HCl + alcohol → D,L-carnitine ester (IV);
IV + HCl + water → D,L-carnitine (V).

When, for instance, D- and L-carnitine is to be prepared from D,L-carnitine nitrile, the following method may be used according to the invention:

The hydroxide or a salt, e.g. the carbonate, of D,L-carnitine nitrile is reacted with one of the above-named optically active acids or with a salt thereof, or with a combination of two acids or their salts; the mixture of the carnitine nitrile salts of the optically active acids thereby obtained, which salts have different solubilities in ethanol or water, may then be separated into the optically active carnitine nitrile salts by fractional crystallization. Thereupon, the carnitine nitrile salts are converted into the corresponding optically active carnitine nitrile chlorides by treatment with ethanolic hydrochloric acid; these chlorides are sparingly soluble in alcohol, the optically active acids, on the other hand, are readily soluble therein. From the carnitine nitrile chlorides, the corresponding carnitine chlorides are subsequently obtained in a known manner, and from the carnitine chlorides pure D-carnitine or L-carnitine, respectively, are isolated in yields amounting to 90–100% of the theoretical values.

In the following, the process of the invention will be more fully described by way of an example, but it should be understood that it is given by way of illustration and not of limitation and that many changes in the details can be made without departing from the spirit of the invention.

Example

From 200 grams D,L-carnitine nitrile-chloride the hydroxide or carbonate is prepared, which is mixed in aqueous solution with the equimolecular amount of D-(+)-camphor sulfonic acid. When the solution is evaporated to about 400–500 milliliters, crystallization will set in. The crystals are filtered (fraction I) and washed with alcohol. The yield is 170 grams carnitine-nitrile-D-camphor sulfonate, $[\alpha]_D = +24.0°$, of which about 90% is pure D-form. When fraction I is re-crystallized from 250 milliliter 90% methanol, we obtain—

Fraction I/1 (by cooling down to room temperature): 115.2 grams $[\alpha]_D = +27.0°$, Fraction I/2 (by cooling the mother liquor of fraction I/1 to 0° C.): 25.6 grams $[\alpha]_D = +27.2°$, total 140.8 grams = 67% of the theoretical value in pure D-form.

Mother liquor and alcoholic rinsing solutions of fraction I are combined and evaporated to dryness. The residue is dissolved in boiling 90% ethanol, and thereto is added the 5–7 fold amount of 30% ethanolic hydrochloric acid. The mass is then cooled to 0° C., whereby crystals will separate out, which are filtered and washed with ethanol: Yield 113.3 grams carnitine nitrile chloride (equal to 95.3% of the theoretical value). This carnitine nitrile chloride is converted into the hydroxide or carbonate, which is dissolved in ethanol. To the solution, dibenzoyl-D(−)-tartaric acid is added in the molar proportion of 1 (acid): 1 (base). Crystallization starts soon, but proceeds slowly. After allowing to stand for 24 hours at room temperature, the coarse crystals are sucked off. By concentrating the mother liquor by evaporation, further fractions are obtained, which are all rinsed with alcohol. A fraction II is thus obtained from the mother liquor and the rinsing alcohols of fraction I, and fraction II is composed of the following individual fractions:

Fraction II/1: 143.3 g carnitine-nitrile-dibenzoyl-D-hydrogentartrate (=51.2% of the theoretical value), of this 99% pure L-form $[\alpha]_D$ (chloride) = −25.7°;

Fraction II/2: 55.8 g carnitine-nitrile-dibenzoyl-D-hydrogentartrate (=19.9% of the theoretical value) of this 98% pure L-form $[\alpha]_D$ chloride = −25.2°;

Fraction II/3: 54.9 g carnitine-nitrile-dibenzoyl-D-hydrogentartrate (=19.6% of the theoretical value), of this 98% pure L-form, $[\alpha]_D$ (chloride) = −25.2°.

Total 254.0 g. (=90.7% of the theoretical value).

If necessary, the mother liquors and alcoholic rinsing solutions are processed once more in the manner described above. The total yield will then be about 99% for the L-form and 97% for the D-form. The second workup could be omitted, when the mother liquors and rinsing alcoholic solutions are used for the preparation of a second batch of starting material, the yield of which will then be increased accordingly.

The thus separated optically active carnitine nitrile salts of the D-(+)-camphorsulfonic acid and the dibenzoyl-D-tartaric acids are finally converted in known manner over the carnitine nitrile chlorides and the carnitine nitrile chlorides and the carnitine chlorides into pure L and D-carnitine. Yields: 95 and 98% respectively, of the theoretical values.

If one of the optically active chlorides still contain a small amount of the racemate, the latter can easily be removed by several recrystallizations with alcohol in the first crystallization operation, since the racemate is very sparingly soluble in cold alcohol, while the optically active carnitine chlorides are readily soluble therein.

The compounds obtained by the new process are extremely pure and are very useful for the removal of anorexia, indigestion, disturbances of growth, for the improvement of protein-utilization, and for the adjustment of metabolism (e.g. in thyrotoxicosis).

It will be understood that, while we have given a detailed description of the process with reference to D-camphorsulfonic acid and dibenzoyl-D-tartaric acid for the separation of the racemic carnitine derivatives, other optically active acids can be used; thus, an equivalent amount of tartaric acid may be used instead of dibenzoyl-D-tartaric acid or may replace camphorsulfonic acid.

Instead of the separation by way of nitriles, separation may be carried out similarly by way of esters.

What is claimed is:

1. A process for producing pure D-carnitine nitrile-chloride which comprises adding to a derivative selected from the group consisting of D,L-carnitine nitrile hydroxide and D,L-carnitine nitrile carbonate the equivalent amount of D-camphorsulfonic acid in a solvent selected from the group consisting of water and ethanol, evaporating the solvent until crystallization sets in, sucking off the crystallized sludge consisting substantially of D-carnitine nitrile-D-camphor sulfonate, purifying the crystal sludge by recrystallization, and preparing therefrom by treatment with alcoholic hydrochloric acid the D-carnitine-nitrile-chloride.

2. A process for producing pure L-carnitine nitrile-chloride which comprises adding to a derivative selected from the group consisting of D,L-carnitine nitrile hydroxide and D,L-carnitine nitrile carbonate the equivalent amount of D-camphorsulfonic acid in a solvent selected from the group consisting of water and ethanol, evaporating the solvent until crystallization sets in, sucking off the crystallized sludge consisting substantially of D-carnitine nitrile-D-camphorsulfonate, partly evaporating the mother liquor obtained after separation of the crystallized sludge, isolating from the evaporated residue L-carnitine nitrile-D-camporsulfonate by recrystallization, and reacting the last-mentioned compound with alcoholic hydrochloric acid, thereby obtaining L-carnitine nitrile-chloride.

3. A process for producing pure L-carnitine nitrile-chloride, which comprises adding to a derivative selected from the group consisting of D,L-carnitine nitrile hydroxide and D,L-carnitine nitrile carbonate the equivalent amount of D-camphorsulfonic acid in a solvent selected from the group consisting of water and ethanol, evaporating the solvent until crystallization sets in, sucking off the crystallized sludge consisting substantially of D-carnitine nitrile-D-camphorsulfonate, partly evaporating the mother liquor obtained after separation of the crystallized sludge, converting the residue with alcoholic hydrochloric acid into carnitine-nitrile-chloride, forming therefrom once more the carnitine-nitrile hydroxide, adding thereto the calculated amount of an optically active acid selected from the group consisting of L-camphor-sulfonic acid, di-benzoyl-D-tartaric acid and D-tartaric acid in a solvent selected from the group consisting of water and ethanol, evaporating the solvent, obtaining from the residue L-carnitine nitrile by recrystallization, and preparing from the nitrile the carnitine-nitrile chloride by treatment with alcoholic hydrochloric acid.

4. A process for the preparation of pure L-carnitine nitrile-chloride which comprises adding to a derivative selected from the group consisting of D,L-carnitine nitrile hydroxide and D,L-carnitine-nitrile carbonate the equivalent amount of L-camphorsulfonic acid in a solvent selected from the group consisting of water and ethanol, evaporating the solvent until crystallization sets in, sucking off the crystallized sludge consisting substantially of L - carnitine nitrile - L - camphorsulfonate, purifying the crystal sludge by recrystallization, and preparing therefrom by treatment with alcoholic hydrochloric acid the L-carnitine nitrile chloride.

5. A process for preparing pure D-carnitine nitrile-chloride which comprises adding to a derivative selected from the group consisting of D,L-carnitine nitrile hydroxide and D,L-carnitine-nitrile carbonate the equivalent amount of L-camphorsulfonic acid in a solvent selected from the group consisting of water and ethanol, evaporating the solvent until crystallization sets in, sucking off the crystallized sludge consisting substantially of L-carnitine nitrile-L-camphorsulfonate, partly evaporating the mother liquor from which the L-carnitine derivative has been separated, isolating from the evaporated residue D-carnitine nitrile-L-camphorsulfonate by recrystallization, and reacting the last-mentioned compound with alcoholic hydrochloric acid, thereby obtaining D-carnitine nitrile chloride.

6. A process for producing pure D-carnitine nitrile-chloride which comprises adding to a derivative selected from the group consisting of D,L-carnitine nitrile hydroxide and D,L-carnitine nitrile carbonate the equivalent amount of L-camphorsulfonic acid in a solvent selected from the group consisting of water and ethanol, evaporating the solvent until crystallization sets in, sucking off the crystallized sludge consisting substantially of L-carnitine nitrile-L-camphorsulfonate, partly evaporating the mother liquor, converting the residue with alcoholic hydrochloric acid into carnitine-nitrile chloride, forming therefrom once again carnitine nitrile hydroxide, adding thereto D-camphorsulfonic acid in a solvent selected from the group consisting of water and ethanol, evaporating the solvent and obtaining D-carnitine nitrile-D-camphorsulfonate from the residue by recrystallization, and producing therefrom with alcoholic hydrochloric acid D-carnitine-nitrile chloride.

References Cited in the file of this patent

Tomita et al.: Z. physiol. Chem., vol. 169, pp. 263–77 (1927).

Fieser et al.: Organic Chemistry, 2d ed., pp. 267–271 (1950).

Strack et al.: Ber., 86 (1953), pages 525 to 529.

Friedman et al.: "Archives of Biochemistry and Biophysics," vol. 59 (1955), pages 484 to 490; vol. 66 (1957), pages 10 to 15.

Fraenkel et al.: "Vitamins and Hormones," vol. 15 (1957), pages 73 and 86.